Aug. 1, 1961   E. L. FRANKE, JR   2,994,512
APPARATUS FOR STRETCHING A FLEXIBLE HELICAL ARTICLE
Filed May 12, 1959   4 Sheets-Sheet 1

INVENTOR
E. L. FRANKE, JR
BY
H. J. Winegar
ATTORNEY

Aug. 1, 1961 E. L. FRANKE, JR 2,994,512
APPARATUS FOR STRETCHING A FLEXIBLE HELICAL ARTICLE
Filed May 12, 1959 4 Sheets-Sheet 2

INVENTOR
E. L. FRANKE, JR.
BY
H. J. Winegar
ATTORNEY

INVENTOR.
E. L. FRANKE JR.
BY
H. J. Winegar
ATTORNEY

INVENTOR
E. L. FRANKE, JR.

United States Patent Office 2,994,512
Patented Aug. 1, 1961

2,994,512
APPARATUS FOR STRETCHING A FLEXIBLE HELICAL ARTICLE
Edward L. Franke, Jr., Cub Hill, Md., assignor to Western Electric Company, Incorporated, New York, N.Y., a corporation of New York
Filed May 12, 1959, Ser. No. 812,722
6 Claims. (Cl. 254—51)

The present invention relates generally to apparatus for stretching a flexible helical article, and more particularly to apparatus for separating adjacent convolutions of a spring cord by deforming the cord into an undulate configuration.

Accordingly, the general object of the invention is to provide apparatus for stretching a flexible helical article.

Another object of the invention is to provide apparatus for separating adjacent convolutions of a spring cord by deforming the cord into an undulate configuration.

According to a preferred process of manufacturing spring cords for telephone handsets, a desired straight length of jacketed multiconductor cordage is wound in a helix along the length of a rotating and longitudinally moving mandrel, preferably as disclosed in a related copending application of E. C. Hardesty and D. L. Myers, Serial No. 681,035, filed on August 29, 1957 now Patent No. 2,920,351 which issued January 12, 1960. As disclosed in that application, the cordage is first cut to length, and is then tipped and banded before winding on the mandrel. After the winding operation, the trailing end of the cord is clamped to the mandrel, and then the mandrel with the helical coil clamped thereto is placed in an oven and heat treated to impart desired properties, particularly retractility and freedom from objectionable strain in the jacketing material.

In a preferred type of cord, the jacketing material comprises a multi-ply plasticized polyvinyl-chloride composition having elastic properties, as disclosed in a related copending application of V. T. Wallder, Serial No. 529,641, filed on August 22, 1955. According to that application, a suitable elastic composition comprises 50–70 parts by weight of polyvinyl chloride which may contain up to about 10% of copolymerized vinyl acetate, 15–25 parts by weight of a monomeric plasticizer such as di-2-ethyl hexyl phthalate, 15–25 parts by weight of polymeric plasticizer such as dibasic acid-glycol polyester, and minor proportions of suitable stabilizers, lubricants and pigments. After the winding of such a cord on a mandrel, the cord is heated on the mandrel to a temperature above the softening point of the polyvinyl-chloride composition to relieve strains in the jacketing material, and is then cooled.

After cooling to room temperature, the heat-treated cord is removed from the mandrel and the pitch of the helix is reversed in order to provide a cord having greater retractility, as disclosed in applicant's related copending application, Serial No. 681,034, filed August 29, 1957, now Patent No. 2,920,348 which issued January 12, 1960, As disclosed in that application, an endless conveyor is provided having a succession of opposing, aligned pairs of rotatable clamps mounted thereon for advancement therewith. At a loading station, a succession of cords is inserted between the advancing pairs of clamps, each cord being secured at each end by one clamp. The conveyor advances the clamps in synchronism so that the cords proceed in a direction transverse to their lengths to various operating stations of the machine. At one station along the conveyor, the opposing clamps of each pair are rotated in opposite directions with respect to each other so as to reverse the pitch of the helix and so as to impart a predetermined overtwist to the reversed cord. At a later station, a small amount of relative rotation of the clamps in the opposite direction to that of the reversing operation is caused in order to remove the overtwist.

In the manufacture of the mentioned type of spring cords with the process outlined above, and in various cases where heat treating of a helically coiled, plastic-jacketed cord is utilized, it has been found that there is a tendency for adjacent convolutions of the cord to adhere tenaciously to each other as a result of the heat-treating operation.

Accordingly, a specific object of the present invention is to provide a conveyorized apparatus designed to separate adjacent convolutions of a succession of spring cords previous to a helix-reversing operation.

The foregoing and other objects are accomplished, according to certain features of the invention, by providing a plurality of members such as pulleys mounted in a common plane in spaced relationship to each other so that a helical article may pass transversely of its length into and through a plane, with the pulleys being positioned out of alignment with each other in a direction perpendicular to the article and with at least one pulley being initially positioned on each side of the article. Means are provided for advancing the article transversely of its length between the pulleys, and means operable as the article advances into the plane of the pulleys for moving at least one pulley from its initial position into engagement with the article and to a position on the opposite side of the article from its initial position. With this arrangement, the helical article is pushed by the moving pulley or pulleys into an undulate stretched configuration wrapped around portions of the peripheries of all of the pulleys.

Preferably, the article is a spring cord, clamps are provided for holding opposite ends of the cord, and a conveyor is provided for advancing an endless succession of the clamps to carry a succession of cords between the pulleys. The pulleys are mounted in fixed and movable groups initially positioned on opposite sides of the cord, with spaces being provided between the pulleys of the fixed group to receive the movable pulleys therebetween. As each cord approaches the pulleys, a photocell senses the presence of the cord and operates the movable group of pulleys to stretch the cord and separate adjacent convolutions thereof, with further means being operated after the stretching operation to return the movable pulleys to their initial positions.

Other objects, advantages and features of the invention will appear from the following detailed description of a specific embodiment thereof, when read in conjunction with the appended drawings, in which.

Figure 1:
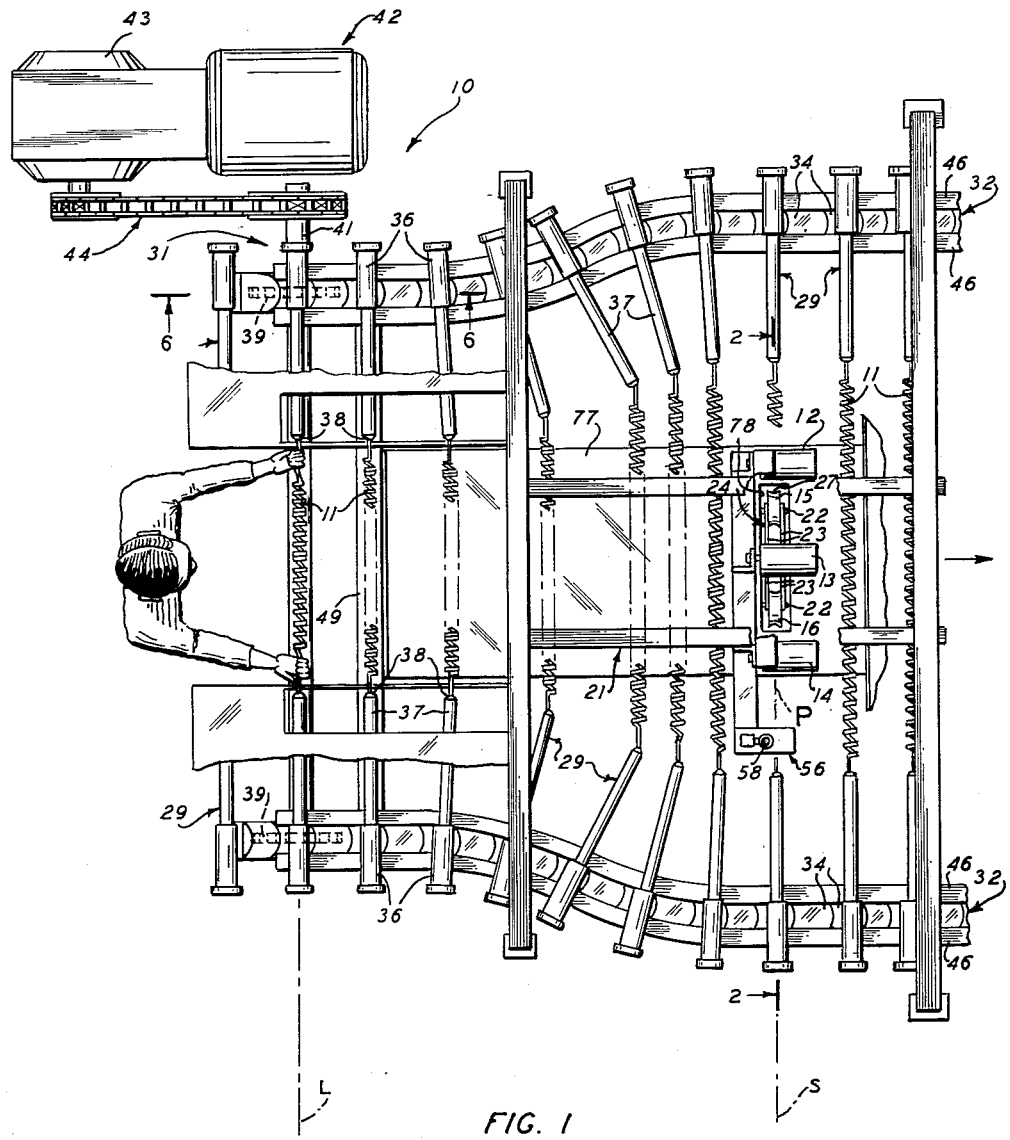
FIG. 1 is a plan view of a portion of a conveyorized spring-cord working machine, including a mechanism illustrative of the present invention for stretching the cords to separate adjacent convolutions thereof.

Referring now in detail to the drawings and in particular to FIG. 1, means designated generally by numeral 10 are provided for advancing a flexible helical article, and more particularly a succession of spring cords 11—11, between a plurality of spaced pulleys designed for stretching the cords to separate adjacent convolutions thereof. As viewed in FIG. 2, there are three upper pulleys 12, 13 and 14 provided, which are mounted for free rotation about fixed axes, and two lower pulleys 15 and 16, which are mounted for free rotation about movable axes. All of the pulleys are mounted in predetermined spaced relationship to each other in a common plane, which plane is designated by the letter P in FIG. 1 and is parallel to the plane of the paper in FIGS. 2 and 3.

The advancing means 10 moves a spaced succession of the cords 11—11 transversely of their lengths, from left to right as viewed in FIG. 1, into and through the plane P of the pulleys. As viewed in FIG. 2, the upper pulleys 12, 13 and 14 are mounted entirely above the cords 11—11, while the lower pulleys 15 and 16 are normally and initially positioned entirely below the cords 11—11 so that the cords may advance between the upper and lower pulleys. As each cord 11 in the series approaches the pulleys, means designated generally by the numeral 17 operate to move the lower pulleys 15 and 16 upward from the initial position illustrated in FIG. 2 to an operating position shown in FIG. 3, where the pulleys 15 and 16 have been moved into spaces between the upper pulleys 12, 13 and 14. As the pulleys 15 and 16 move upward, they engage the cord 11, as indicated, and push it into an undulate stretched configuration wrapped around portions of the peripheries of all of the pulleys. Immediately after a desired movement upward of the lower pulleys 15 and 16 to stretch each cord 11, these pulleys are lowered back to their initial positions illustrated in FIG. 2 in preparation for the advancement of the next successive cord 11.

Figure 2:
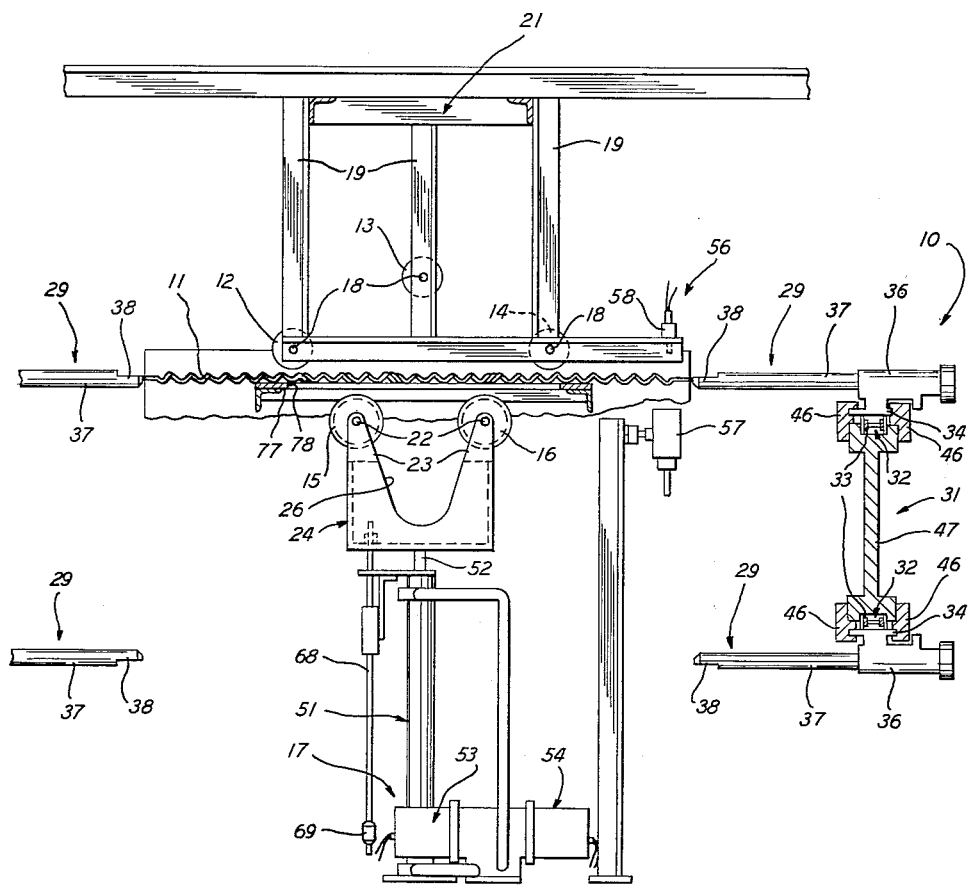
FIG. 2 is an enlarged, fragmentary, vertical section of a portion of the stretching apparatus illustrated in FIG. 1, taken generally along the line 2—2 of FIG. 1 in the direction of the arrows and illustrating a preferred arrangement of separating pulleys in their initial or inoperative positions.
Figure 3:
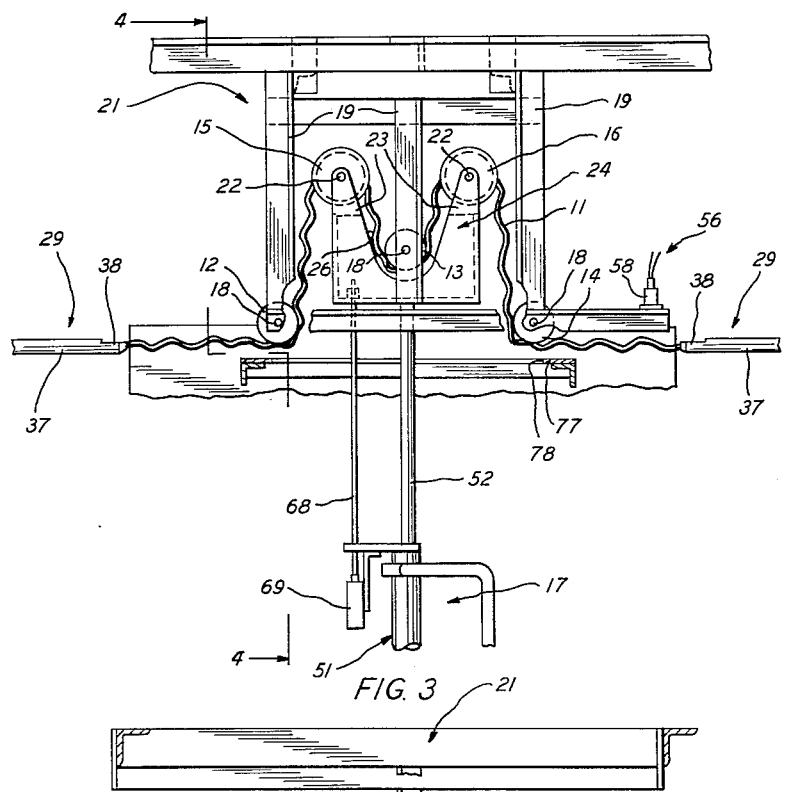
FIG. 3 is a view similar to a portion of FIG. 2, but illustrating certain pulleys moved to operating positions where the pulleys stretch a cord.
Figure 4:
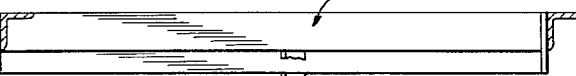
FIG. 4 is a vertical section of the apparatus as illustrated in FIG. 3, taken generally along the line 4—4 of FIG. 3 in the direction of the arrows.
Figure 5:
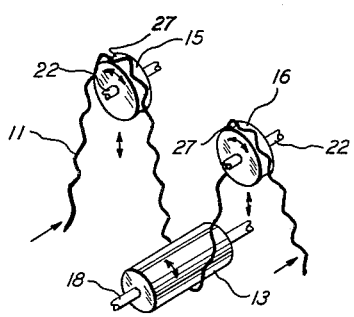
FIG. 5 is an enlarged perspective view illustrating the arrangement of three pulleys, detached from supporting structure, during the stretching operation.

The upper pulleys 12, 13 and 14 preferably comprise elongated rollers, as illustrated in FIGS. 1, 4 and 5, mounted rotatably on shafts 18—18 which are carried in cantilever fashion by three spaced depending arms 19—19 of a fixed support or frame designated generally by the numeral 21. As indicated in FIGS. 2 and 3, it is preferred to mount the end pulleys 12 and 14 on the frame 21 in a horizontal line just above the cords 11—11, with the central pulley 13 being somewhat higher up so that the cord 11 will be stretched into a generally M-shaped configuration illustrated in FIGS. 3 and 5. The elongated rollers will retain contact with the cords 11—11 even though the cords are moving from left to right as viewed in FIG. 1 during the stretching operation, it being understood that the speed of advancement is relatively slow compared to the reciprocating speed of the lower pulleys so that the cords 11—11 will not pull off of the pulleys 12, 13 and 14.

The lower pulleys 15 and 16 are carried rotatably on shafts 22—22 between two pairs of spaced plates 23—23 projecting from upper portions of a movable support or carrier 24. The carrier 24 is formed with a U-shaped cutout portion 26 at the upper center thereof so that the lower pulleys 15 and 16 may be inserted between the upper pulleys 12, 13 and 14 to a point where the upper pulley 13 is received in the cutout portion 26. Each of the lower pulleys 15 and 16 is formed with a peripheral groove 27 best illustrated in FIG. 5, which is designed for retaining the cords 11—11 therein even though the cords are being continuously advanced during the stretching operation.

As each cord 11 in succession is pushed by the moving pulleys 15 and 16 into the M-shaped configuration illustrated, wrapped around portions of the peripheries of all of the pulleys, the cord 11 is stretched over substantially the entire coiled length thereof so as to accomplish generally uniform localized extension of the coiled convolutions over the entire length of the cord. This type of uniform extension is designed to apply extensile forces at various places along the length of the cord 11 and is effective to separate each convolution of the cord from every other convolution by pulling the convolutions apart. Thus, any convolutions which stick together as a result of the heat-treating operation described hereinbefore, or which adhere to each other for any other reason, are separated without applying an undue extensile force to the cord as a whole.

It will be obvious that by varying the number, spacing, and amount of movement of the pulleys, the cord 11 may be deformed into any of various generally undulate configurations required to stretch a particular cord any desired amount. One convenient way of providing an apparatus adapted to handle cords of different lengths and types is to provide an adjustable stroke for the reciprocating carrier 24 so that the lower pulleys 15 and 16 move upward through a prescribed distance, which may be selected in accordance with the properties of the cords 11—11 being operated on. As the cord 11 is stretched, all of the pulleys rotate freely on their axes to permit free shifting of the position of the cord 11 along its longitudinal axis as it is being deformed.

As best illustrated in FIG. 1, the advancing means 10 includes a plurality of aligned pairs of clamps designated generally by the numerals 29—29, each pair being designed for clamping the opposite ends of a spring cord 11. An endless succession of the aligned pairs of clamps 29—29, each carrying a cord 11 therebetween, is advanced from left to right, as viewed in FIG. 1, by an endless conveyor, designated generally by the numeral 31. At a loading station L at the left end of the conveyor 31, an operator fastens the ends of a cord 11 between the advancing clamps 29—29, after which the conveyor 31 carries the clamps 29—29 and the cords 11—11 to a stretching station S, where the cords pass between and are deformed by the pulleys 12 to 16 as previously described.

The clamps 29—29 grip the ends of the cords tightly in order to prevent the cord ends from pulling out of the clamps during the stretching operation. As illustrated in FIGS. 2 and 3, the pulleys 12 and 14 are so positioned on the frame 21 that the end portions of the cord 11 extend in substantially straight horizontal lines between the clamps 29—29 and the pulleys 12 and 14. This construction tends to prevent the cord ends from pulling loose from the clamps 29—29, since only horizontal extensile forces are applied at the clamps 29—29.

As indicated in FIG. 1, the conveyor 31 is arranged so as to move the clamps 29—29 holding a particular cord 11 relatively away from each other to stretch the cord from the ends thereof before the cord passes between the pulleys 12 to 16. Thus, the cord 11 is in a partially stretched state before it advances to the pulleys for a more complete stretching operation.

The conveyor 31 is further arranged so that the clamps 29—29 of each aligned pair remain separated, with respect to their original positions at the loading station L, after the stretching operation, with the cords 11—11 being extended somewhat to maintain the convolutions separated. This construction facilitates subsequent cordworking operations, such as the helix-reversing operation disclosed in applicant's copending application mentioned hereinbefore. For the purposes of that application, the clamps 29—29 are rotatable to reverse the helix of the cords 11—11; but for the purposes of the present application, the clamps are not rotated. If the separating apparatus disclosed herein were used by itself, then nonrotatable clamps of any suitable type could be provided.

Figure 6:
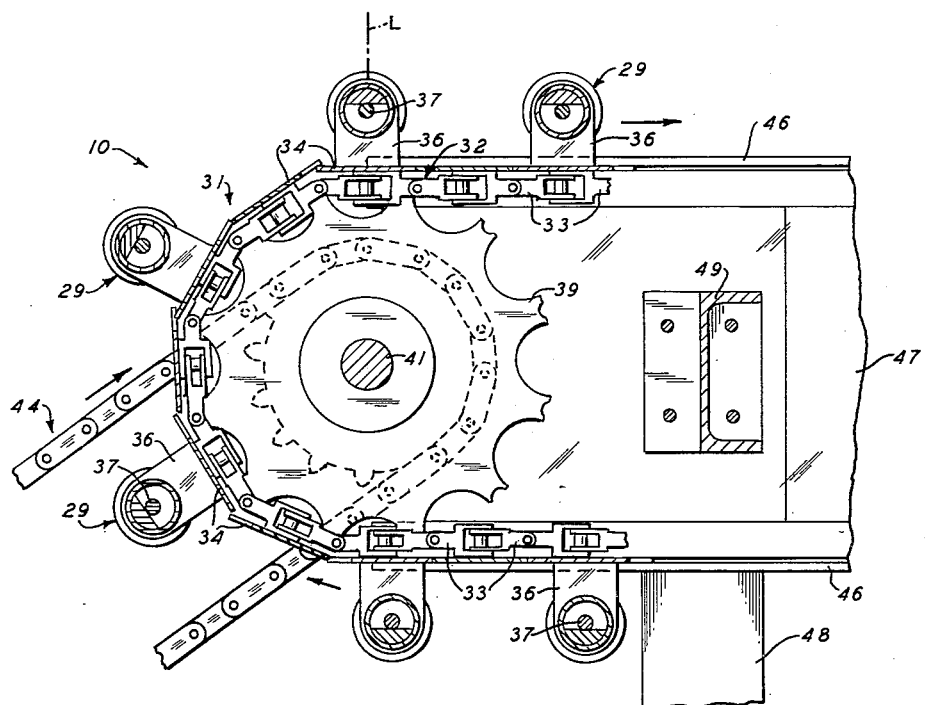
FIG. 6 is an enlarged, fragmentary, vertical section of a portion of the apparatus illustrated in FIG. 1, taken generally along the line 6—6 of FIG. 1 in the direction of the arrows and showing the construction of a preferred form of conveying mechanism, and, FIG. 7 is a schematic diagram of an electrical control circuit in accordance with the invention.

A preferred form of conveyor 31 is illustrated in FIGS. 1, 2 and 6 and is generally similar to the conveyor system disclosed in applicant's copending application. As viewed in FIG. 1, the conveyor 31 includes two endless chains, designated generally by the numerals 32—32, one at each side of the apparatus. Each of the chains 32—32 includes a plurality of pivotably connected links 33—33, with a plurality of flat plates 34—34 secured to the outer surface of alternate links 33—33, as viewed in FIG. 6. All or some of the plates 34—34 carry a housing 36, within which is journalled a shaft 37 of the clamp 29. In the example illustrated, there is a housing 36 for every second plate 34 in order to provide a desired spacing between the cords 11—11 consistent with the speed of advancement thereof and the operator's ability to insert the cords into the clamps 29—29 at the loading station L. Other arrangements might be utilized in appropriate cases, such as one housing 36 for each plate 34 or one housing 36 for every third plate 34. A clamping jaw 38 is formed at the inner end of each shaft 37, as viewed in FIGS. 1, 2 and 3.

The links 33—33 of each chain 32 pass around an associated sprocket wheel 39 at the left end of the apparatus, as viewed in FIGS. 1 and 6, and about a similar sprocket wheel (not shown) at the right-hand end of the apparatus. The two sprocket wheels 39—39 are keyed to a common drive shaft 41 and are driven from a motor 42, through the intermission of a gear reduced 43 and a sprocket-and-chain transmission designated generally by the numeral 44. With this construction, the opposed pairs of clamps 29—29 are always aligned horizontally with each other to advance a continuous succession of the cords 11—11 in generally horizontal attitudes, transversely of their lengths, between the pulleys 12—13—14 and 15—16.

The distance between each aligned pair of clamps 29—29 at any point along the line of advancement of the cords 11—11 is controlled by providing a pair of guide rails 46—46 for receiving each one of the chains 32—32. The rails 46—46 receive the chains 32—32 therebetween so as to permit sliding horizontal movement of the chains 32—32 under the influence of the motor 42. Since it is desired to diverge the aligned pairs of clamps 29—29 so as to stretch the cords 11—11 previous to advancement thereof to the stretching station S, the rails 46—46 diverge uniformly outward on both sides of the machine just before the stretching station S.

In the embodiment illustrated, as best seen at the right of FIG. 2, two identical pairs of rails 46—46 are secured to the top and bottom of a rail support 47 having an I-channel cross section and being curved to fit the desired path of the conveyor chains 32—32 indicated in FIG. 1. The upper rails 46—46 illustrated in FIG. 2 receive and guide the upper or operating runs of the chains 32—32, while the lower rails 46—46 receive and guide the lower or return runs of the chains. One rail support 47 is provided at each side of the machine, and these members provide the main supporting structure for the conveyor 31. The supports 47 are mounted above the floor on suitable standards 48—48, one of which is illustrated in FIG. 6. Also, a number of transverse strength members 49—49, one of which is shown in FIGS. 1 and 6, are secured between the front and rear rail supports 47—47 at spaced intervals along the length of the machine to provide a rigid, integral supporting structure.

Referring now to FIGS. 2, 3 and 4, illustrating a preferred form of reciprocating means 17 for the lower pulleys 15 and 16, a fluid cylinder, designated generally by the numeral 51, is provided, having a piston rod 52 connected to the bottom of the carrier 24. The cylinder 51 is operated in one direction to elevate the carrier 24 through the actuation of a first solenoid valve, designated generally by the numeral 53, and is operated in the opposite direction to lower the carrier 24 through the actuation of a second solenoid valve, designated generally by the numeral 54.

A conventional photocell control system designated generally by the numeral 56 is provided, which is designed for sensing the presence of each successive cord 11 as that cord nears the plane P of the pulleys and for operating the "up" solenoid valve 53 when the cord 11 is in line with the lower pulleys 15 and 16. The photocell system 56 includes a light source 57 (FIG. 2) and a cell 58, which is aligned above the light source 57 and is positioned a short distance in advance of the pulleys so that the light beam will be interrupted by a cord 11 each time a cord advances therepast.

Figure 7:
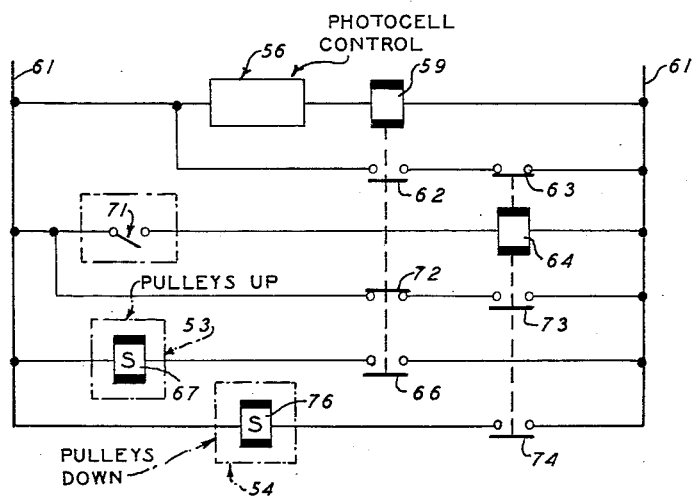

Referring to the control circuit illustrated in FIG. 7, each time the light beam is interrupted a first control relay 59 is energized across a pair of supply conductors 61—61. As the relay 59 is energized, a holding contact 62 thereof closes to maintain the energization circuit therefor around the photocell system 56, through the holding contact 62 and a normally closed contact 63 of a second operating relay 64. The first operating relay 59 also closes an operating contact 66 thereof to energize an operating solenoid 67 of the "up" solenoid valve 53, which functions to raise the pulleys 15 and 16 into their stretching positions.

As best illustrated in FIGS. 2, 3 and 4, a vertical rod 68 is secured to the bottom of the carrier 24 for reciprocating movement therewith. A switch actuator 69 is carried at the lower end of the rod 68, and is effective to close a limit switch 71 (FIGS. 4 and 7) when the lower pulleys 15 and 16 have been moved upward to a desired maximum extension. When the switch 71 is momentarily closed, the second control relay 64 is energized to reopen the contact 63 thereof and de-energize the first control relay 59. At the same time, the relay 64 closes a holding contact 73, which maintains that relay energized, around the switch 71, through a now-closed, normally-closed contact 72 of the now-deenergized relay 59 and the contact 73. The relay 64 also closes an operating contact 74 to energize an operating solenoid 76 of the "down" solenoid valve 54, which operates to return the pulleys 15 and 16 to their original positions.

Thus, the operating relays 59 and 64 are operated alternately by the photocell system 56 and the limit switch 71 to raise and lower the movable pulleys. The timing is important; specifically, it is necessary that the fluid cylinder 51 and the control circuit operate fast enough, having regard to the speed of the conveyor 31 and the spacing between the adjacent pairs of clamps 29—29, to return the lower pulleys 15 and 16 to their initial or "down" positions before the next successive cord 11 trips the photocell system 56.

As the pulleys 15 and 16 are turned to their "down" positions illustrated in FIG. 2, these pulleys lose contact with the cord 11 and the cord is advanced by the conveyor 31 to a subsequent operating station along the machine. In order to facilitate disengagement of the cord 11 with the grooved lower pulleys 15 and 16, a flat shelf 77 is provided for supporting the center of each cord 11 before and after the stretching operation; thus maintaining the entire cord 11 in the fixed vertical plane illustrated in FIG. 2, midway between the upper pulleys 12, 13 and 14 and the lower pulleys 15 and 16 and out of contact with all of the pulleys. As best seen in FIG. 1, the shelf 77 is formed with a slot 78 cut out therefrom to permit reciprocation of the lower pulleys 15 and 16 and the carrier 24 therethrough.

While certain specific embodiments of the invention have been described hereinabove, it will be obvious that various modifications may be made from the specific details described without departing from the spirit and scope of the invention.

What is claimed is:

1. Apparatus for stretching a flexible helical article, which comprises a plurality of pulleys mounted in a common plane in spaced relationship to each other so that the helical article may pass transversely of its length through the plane, with the pulleys being positioned out of alignment with each other in a direction perpendicular to the article and with at least one pulley on each side of the article, a plurality of aligned pairs of clamps, each pair being designed for securing opposite ends of the article to be stretched, an endless conveyor designed for advancing the pairs of clamps in endless synchronized succession so that the articles are carried in succession transversely of their lengths between said pulleys, means operable each time one of the articles is carried by a pair of clamps to a position near the plane of the pulleys for moving at least one pulley from its initial position into engagement with the article and to a position such that the article is pushed into an undulate stretched configuration wrapped around portions of the peripheries of all of said pulleys, and means operable after the stretching of each article for returning each moved pulley to its initial position in time to permit a second stretching movement as the next successive article approaches said pulleys.

2. Apparatus for stretching a flexible helical article, which comprises first and second pulleys mounted in a common plane for free rotation about fixed axes, a third pulley mounted in the same plane for free rotation about a movable axis, said third pulley being initially positioned away from said first and second pulleys so that the helical article may advance transversely of its length through the plane, with said first and second pulleys being on one side of said article and said third pulley being on the opposite side thereof, said first and second pulleys being spaced from each other such distance that said third pulley may be inserted therebetween, means for holding opposite end portions of the article in predetermined spaced relationship, means for moving said holding means to advance the article transversely of its length between said pulleys, and means operable as the article approaches the plane of the pulleys for moving said third pulley from its initial position into engagement with the article and into the space between said first and second pulleys so that the article is pushed by said third pulley into an undulate stretched configuration wrapped around portions of the peripheries of all three pulleys.

3. Apparatus for stretching a flexible helical article, which comprises first and second pulleys mounted in a common plane for free rotation about fixed axes, a third pulley mounted in the same plane for free rotation about a movable axis, said third pulley being initially positioned away from said first and second pulleys so that the helical article may advance transversely of its length through the plane, with said first and second pulleys being on one side thereof and said third pulley being on the opposite side thereof, said first and second pulleys being spaced from each other such distance that said third pulley may be inserted therebetween, clamping means for individually holding opposite end portions of each of a succession of articles, means for moving the clamping means to advance the succession of articles transversely of their lengths between said pulleys, a photocell designed for sensing the presence of each article as said article approaches the plane of said pulleys, means operated by said photocell for moving said third pulley from its initial position into engagement with the article and into the space between said first and second pulleys so that the article is pushed by said third pulley into an undulate stretched configuration wrapped around portions of the peripheries of all three pulleys, and means operable immediately after the stretching of each article for returning said third pulley to its initial position.

4. Apparatus for separating adjacent convolutions of a succession of spring cords, which comprises a fixed support; first, second and third pulleys mounted in a common plane on said fixed support for free rotation; a reciprocable support; fourth and fifth pulleys mounted in the same plane on said reciprocable support for free rotation, said reciprocable support being initially positioned so that said fourth and fifth pulleys are spaced from said first, second and third pulleys such a distance that the cords may advance transversely of their lengths through the plane of said pulleys, with said first, second and third pulleys being on one side thereof and said fourth and fifth pulleys being on the opposite side thereof, said first, second and third pulleys being spaced from each other such distances that said fourth and fifth pulleys may be inserted therebetween; a plurality of aligned pairs of clamps, each pair being designed for securing opposite ends of a cord; an endless conveyor designed for advancing the pairs of clamps in endless synchronized succession so that the cords are carried in succession transversely of their lengths between said pulleys; a photocell designed for sensing the presence of each successive cord as it nears the plane of said pulleys; a fluid-cylinder system operated by said photocell to move said reciprocable support in a first direction such that said fourth and fifth pulleys engage the cord and carry it into the spaces between said first, second and third pulleys, whereby the cord is pushed by said fourth and fifth pulleys into an undulate stretched configuration wrapped around portions of the peripheries of all of said pulleys and the convolutions of the cord are separated from each other; and a limit switch responsive to a maximum desired movement of said reciprocable support for reversing the operation of said fluid-cylinder system and returning said reciprocable support to its initial position in time to permit a second movement controlled by the photocell as the next successive cord approaches said pulleys.

5. Apparatus for stretching a flexible helical article, which comprises a plurality of article-engaging members mounted in a common plane in spaced relationship to each other so that the helical article may pass transversely of its length through the plane, the article-engaging members being positioned out of alignment with each other in a direction perpendicular to the article and with at least one of said members on each side of the article, holding means for gripping opposite end portions of the article to be stretched and for holding said end portions in predetermined spaced relationship, means for moving the holding means so as to advance the article transversely of its length between the article-engaging members, means operable as the article approaches the common plane of the article-engaging members for moving at least one of said members from its normal position and into engagement with the article, the movement continuing to a subsequent position such that the article is forced into an undulate, stretched configuration wrapped partially around portions of the article-engaging surfaces of each of said members, and means operable after the stretching of the article for returning each moved article-engaging member to its normal position.

6. Apparatus in accordance with claim 5, wherein the article-engaging members are freely rotatable pulleys.

References Cited in the file of this patent

UNITED STATES PATENTS

| | | |
|---|---|---|
| 1,313,509 | Vincent | Aug. 19, 1919 |
| 1,718,793 | Malke | June 25, 1929 |
| 2,649,888 | Fay | Aug. 25, 1953 |